US012326061B2

(12) United States Patent
Patton et al.

(10) Patent No.: US 12,326,061 B2
(45) Date of Patent: Jun. 10, 2025

(54) METHODOLOGY AND SYSTEM FOR UTILIZING RIG MUD PUMP ASSEMBLY

(71) Applicant: Schlumberger Technology Corporation, Sugar Land, TX (US)

(72) Inventors: Bartley Patton, Rosharon, TX (US); William Troy Huey, Denver, CO (US); Mark Vaughan, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/351,204

(22) Filed: Jul. 12, 2023

(65) Prior Publication Data

US 2024/0309727 A1 Sep. 19, 2024

Related U.S. Application Data

(60) Provisional application No. 63/490,956, filed on Mar. 17, 2023.

(51) Int. Cl.
*E21B 21/08* (2006.01)
*B28C 9/00* (2006.01)
(Continued)

(52) U.S. Cl.
CPC .............. *E21B 33/13* (2013.01); *B28C 9/004* (2013.01); *E21B 7/00* (2013.01); *E21B 21/062* (2013.01); *E21B 21/08* (2013.01)

(58) Field of Classification Search
CPC .......... E21B 21/08; E21B 33/13; B28C 9/004
See application file for complete search history.

(56) References Cited

U.S. PATENT DOCUMENTS 1,137,134 A 4/1915 Harley
2,194,054 A 3/1940 Arvid
(Continued)

FOREIGN PATENT DOCUMENTS

CN 106050215 A 10/2016
CN 215719294 2/2022
(Continued)

OTHER PUBLICATIONS

Office Action issued in U.S. Appl. No. 18/351,223 dated Jun. 6, 2024, 10 pages.
(Continued)

*Primary Examiner* — Matthew R Buck
(74) *Attorney, Agent, or Firm* — Jeffrey D. Frantz

(57) ABSTRACT

A technique facilitates a drilling operation, e.g. a land-based drilling operation, by enabling a substantial reduction in the number of equipment components. According to an embodiment, a mud pump assembly is provided with at least one mud pump located on a rig positioned at a wellsite. The mud pumps may be run to perform a mud pumping operation by pumping mud downhole during drilling of a borehole, e.g. a wellbore. During stoppage of the mud pumping operation, the same mud pumps are utilized to perform a cementing operation in which cementing fluid is pumped downhole for cementing of casing. The use of the same mud pumps enables the operator to eliminate not only the separate cement pumps otherwise used for the cementing operation but also the motive units that would be associated with those separate cement pumps.

20 Claims, 5 Drawing Sheets

(51) Int. Cl.

| | |
|---|---|
| ***E21B 7/00*** | (2006.01) |
| ***E21B 21/06*** | (2006.01) |
| ***E21B 33/13*** | (2006.01) |

(56) References Cited

U.S. PATENT DOCUMENTS

| | | | |
|---|---|---|---|
| 2,216,573 | A | 10/1940 | Owsley |
| 2,282,597 | A | 5/1942 | Archer |
| 3,201,093 | A | 8/1965 | Smith |
| 3,227,213 | A | 1/1966 | Smith |
| 3,435,906 | A | 4/1969 | Nicolson |
| 3,741,533 | A | 6/1973 | Winn |
| 3,891,037 | A | 6/1975 | Well |
| 3,976,148 | A | 8/1976 | Maus |
| 4,178,142 | A | 12/1979 | Schwing |
| 4,191,513 | A | 3/1980 | Schwing |
| 4,341,508 | A | 7/1982 | Rambin, Jr. |
| 4,611,973 | A | 9/1986 | Birdwell |
| 4,634,352 | A | 1/1987 | Austin |
| 4,703,813 | A | 11/1987 | Sieler |
| 4,880,365 | A | 11/1989 | Austin |
| 4,899,832 | A | 2/1990 | Bierscheid, Jr. |
| 5,046,855 | A | 9/1991 | Allen |
| 5,114,239 | A | 5/1992 | Allen |
| 5,289,877 | A | 3/1994 | Naegele |
| 5,344,570 | A | 9/1994 | McLachlan |
| 5,571,281 | A | 11/1996 | Allen |
| 5,580,166 | A | 12/1996 | Schmittchen |
| 5,775,803 | A | 7/1998 | Montgomery |
| 6,048,132 | A | 4/2000 | Kupke |
| 6,048,135 | A | 4/2000 | Williford |
| 6,056,071 | A | 5/2000 | Scott |
| 6,228,153 | B1 | 5/2001 | Saitoh |
| 6,505,691 | B2 | 1/2003 | Judge |
| 6,527,062 | B2 | 3/2003 | Elkins |
| 6,749,330 | B2 | 6/2004 | Allen |
| 6,904,982 | B2 | 6/2005 | Judge |
| 6,925,392 | B2 | 8/2005 | McNeil, III |
| 7,004,730 | B1 | 2/2006 | Williams |
| 7,044,239 | B2 | 5/2006 | Pinckard |
| 7,096,948 | B2 | 8/2006 | Mosing |
| 7,252,147 | B2 | 8/2007 | Badalamenti |
| 7,730,967 | B2 | 6/2010 | Ballantyne |
| 7,823,656 | B1 | 11/2010 | Williams |
| 7,921,937 | B2 | 4/2011 | Brackin |
| 7,980,326 | B2 | 7/2011 | Tibbitts |
| 8,201,628 | B2 | 6/2012 | Lovorn |
| 8,261,826 | B2 | 9/2012 | Lovorn |
| 8,281,875 | B2 | 10/2012 | Lovorn |
| 8,347,957 | B2 | 1/2013 | Stephenson |
| 8,397,836 | B2 | 3/2013 | Pool |
| 8,404,297 | B2 | 3/2013 | Arango Moreno |
| 8,812,236 | B1 | 8/2014 | Freeman |
| 8,833,488 | B2 | 9/2014 | Knudsen |
| 8,899,348 | B2 | 12/2014 | Henderson |
| 8,905,157 | B2 | 12/2014 | Jiao |
| 9,080,407 | B2 | 7/2015 | Bernard |
| 9,169,700 | B2 | 10/2015 | Curtis |
| 9,249,638 | B2 | 2/2016 | Bernard |
| 9,670,749 | B2 | 6/2017 | Pessin |
| 11,174,689 | B2 | 11/2021 | Aguirre |
| 11,371,314 | B2 | 6/2022 | Orban |
| 2005/0121278 | A1 | 6/2005 | Arhab |
| 2006/0196695 | A1 | 9/2006 | Giroux |
| 2006/0239834 | A1 | 10/2006 | Larson |
| 2007/0295509 | A1 | 12/2007 | Pessin |
| 2008/0260545 | A1 | 10/2008 | Frokjaer |
| 2009/0183874 | A1 | 7/2009 | Fordyce |
| 2010/0027371 | A1 | 2/2010 | Lucas |
| 2010/0310384 | A1 | 12/2010 | Stephenson |
| 2013/0118752 | A1 | 5/2013 | Hannegan |
| 2013/0248182 | A1 | 9/2013 | Chong |
| 2014/0299377 | A1 | 10/2014 | Abbassian |
| 2014/0309936 | A1 | 10/2014 | Abbassian |
| 2016/0288368 | A1 | 10/2016 | Orban |
| 2016/0289012 | A1 | 10/2016 | Orban |
| 2016/0334300 | A1 | 11/2016 | Hilpert |
| 2017/0016433 | A1 | 1/2017 | Chong |
| 2017/0101827 | A1 | 4/2017 | Orban |
| 2017/0198554 | A1 | 7/2017 | Dykstra |
| 2017/0226813 | A1 | 8/2017 | Northam |
| 2017/0259457 | A1 | 9/2017 | Chong |
| 2017/0268323 | A1 | 9/2017 | Dykstra |
| 2018/0258719 | A1* | 9/2018 | Orban .................. B28C 7/0418 |
| 2019/0093433 | A1* | 3/2019 | Aguirre ................. F04B 49/007 |
| 2019/0264517 | A1* | 8/2019 | Chong ................ B01F 35/7176 |
| 2020/0080391 | A1 | 3/2020 | Marlatt |
| 2022/0325601 | A1 | 10/2022 | Orban |

FOREIGN PATENT DOCUMENTS

| | | | |
|---|---|---|---|
| WO | 9925608 | A1 | 5/1999 |
| WO | 03001062 | A1 | 1/2003 |
| WO | 2005088131 | A1 | 9/2005 |
| WO | 2016167747 | A1 | 10/2016 |
| WO | 2019165393 | A1 | 8/2019 |
| WO | 2019173842 | A1 | 9/2019 |

OTHER PUBLICATIONS

International Search Report and Written Opinion issued in International Patent application PCT/US2024/020159 on Jul. 3, 2024, 12 pages.

International Search Report and Written Opinion issued in International Patent application PCT/US2024/020152 on Jul. 2, 2024, 11 pages.

* cited by examiner

METHODOLOGY AND SYSTEM FOR UTILIZING RIG MUD PUMP ASSEMBLY

CROSS-REFERENCE TO RELATED APPLICATION

The present document is based on and claims priority to U.S. Provisional Application Ser. No. 63/490,956, filed Mar. 17, 2023, which is incorporated herein by reference in its entirety.

BACKGROUND

Hydrocarbon fluids such as oil and natural gas are obtained from a well located in a subterranean geologic formation, referred to as a reservoir. The well is prepared by drilling and completing a wellbore that penetrates the hydrocarbon-bearing formation. The drilling and completing processes are complex and expensive involving a wide variety of equipment which must be transported to the wellsite and then operated and maintained. This equipment often includes a mud pumping assembly and a cement pumping assembly to facilitate drilling of the wellbore and cementing of a wellbore casing. In a land-based operation, at least some of this equipment may be positioned on a land rig.

Each of the mud pumping assembly and cement pumping assembly comprises expensive dedicated pumps and corresponding motive units for driving the pumps. By way of example, the motive units may include diesel engines, generators, electric motors, and/or various other devices and control systems. In many operations, the mud pumping assembly may be used in combination with a drilling rig to pump mud which is a special fluid for providing lubrication and removing debris during the drilling operation. The cement pumping assembly is used while the mud pumping assembly is stopped to supply cementing fluid for cementing wellbore casing along the wellbore. Substantial expense is involved in transporting all of these components to the wellsite, maintaining these components, and operating these components. Additionally, the equipment requires substantial space at the wellsite.

SUMMARY

In general, a methodology and system are provided for facilitating a drilling operation, e.g. a land-based drilling operation, with a substantial reduction in the number of equipment components. According to an embodiment, a mud pump assembly is provided with at least one mud pump located on a rig positioned at a wellsite. The mud pumps may be run to perform a mud pumping operation by pumping mud downhole during drilling of a borehole, e.g. a wellbore. During stoppage of the mud pumping operation, the same mud pumps are utilized to perform a cementing operation in which cementing fluid is pumped downhole for cementing of casing. The use of the same mud pumps enables the operator to eliminate not only the separate cement pumps otherwise used for the cementing operation but also the motive units that would be associated with those separate cement pumps.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
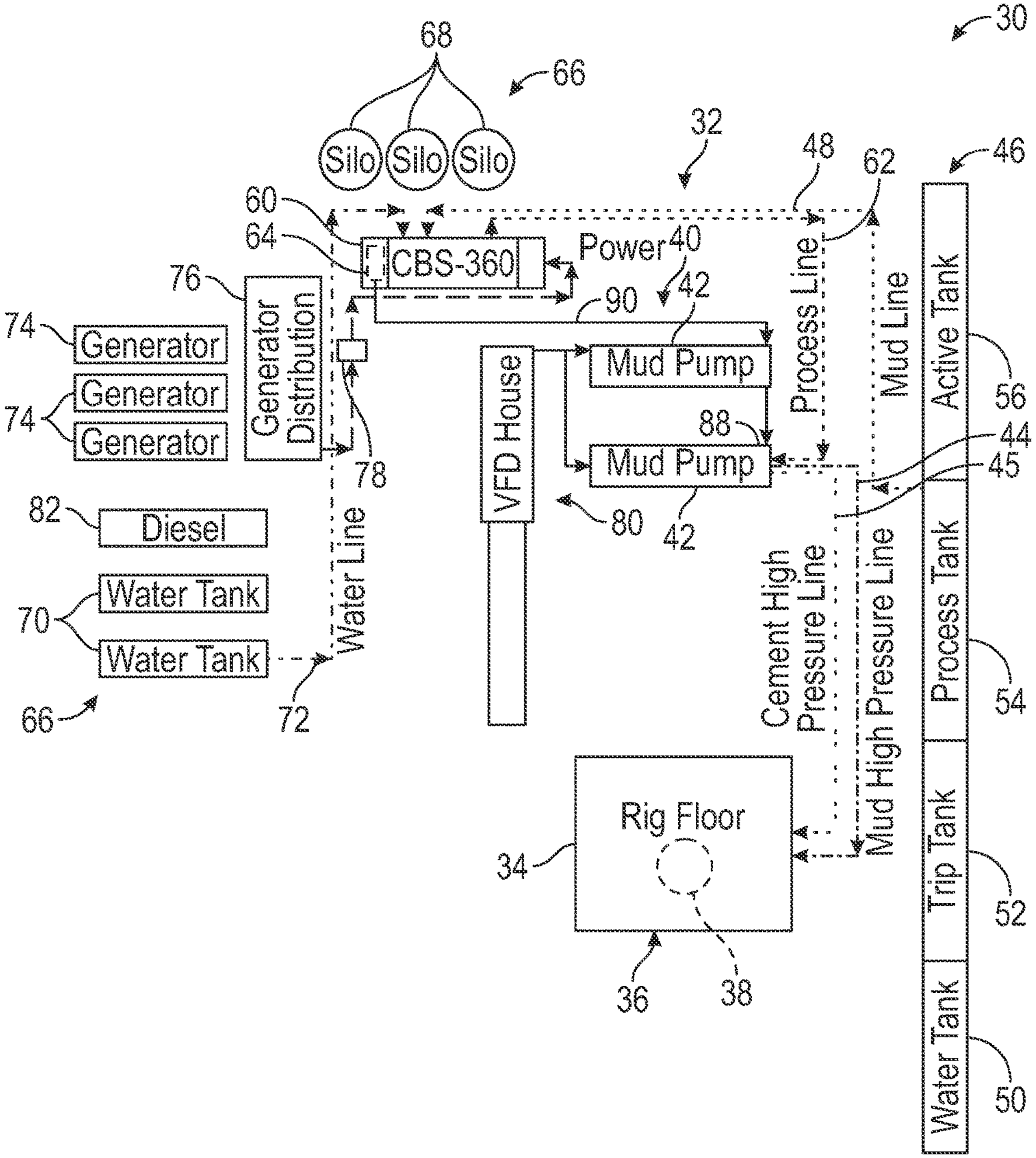
FIG. 1 is an illustration of an example of a wellsite layout in which a mud pump assembly is deployed on a rig and coupled into an overall system to enable utilization for both mud pumping operations and cementing operations, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible. This description is not to be taken in a limiting sense, but rather for the purpose of describing general principles of the implementations. The scope of the described implementations should be ascertained with reference to the issued claims.

The disclosure herein generally involves facilitating a drilling operation, e.g. a land-based drilling operation, with a substantial reduction in the number of equipment components. As described in greater detail below, the methodology facilitates cementing on a rig by utilizing the rig's mud pump assembly for placement of cementing fluid, e.g. cement slurry, during, for example, primary and/or remedial cementing operations. As a result, the conventional cement pump(s) and the cement pump driver(s), e.g. diesel engine, can be eliminated from the wellsite layout.

According to an embodiment, a mud pump assembly is provided with at least one mud pump located on a rig positioned at a wellsite. The mud pumps may be run to perform a mud pumping operation by pumping mud downhole during drilling of a borehole, e.g. a wellbore. During stoppage of the mud pumping operation, the same mud pumps are utilized to perform a cementing operation in which cementing fluid is pumped downhole for cementing of casing. Use of the same mud pumps for both operations enables a wellsite layout which is substantially simplified by removing equipment that would otherwise be required. This approach also substantially reduces costs while also reducing space requirements of the overall wellsite layout.

During a mud pumping operation, fluid in the form of mud is circulated through the borehole, e.g. wellbore, to facilitate drilling of the borehole. The circulating mud provides lubrication and cooling to help advance the drill bit during continued drilling of the borehole. The circulating mud also flushes cuttings from the drill bit back to the surface where they can be separated from the mud, thus allowing reuse of the mud.

As the borehole is drilled, the borehole may be cased by moving sections of casing downhole. A cementing operation is then performed to pump cementing fluid downhole and then up along an exterior of the casing to stabilize the casing within the borehole. To achieve a proper cementing operation, it often is important to make sure mud does not mix with the cementing fluid. Similarly, cementing fluid should not be introduced into the mud during the mud pumping operation. Consequently, the mud pumping assembly is constructed so as to facilitate cleanout of the mud and cementing fluid during transition between the operations.

By way of example, a mud pump suction portion of the mud pump assembly may be modified with a separate cement line which can be isolated from a mud line. Additionally, the mud pump suction portion may incorporate a cleanout port (or ports) which allows the suction portion to be washed. A separate discharge port may be combined with the mud pump assembly for connection of the cement line. This may be done in a manner which protects the rig floor manifold from contamination by cement. The separate cement line may be formed of standard treating iron, high-pressure treating hose, or other suitable tubulars.

To help ensure successful operation of the mud pump assembly for both the mud pumping operation and the cementing operation, various sensor systems may be utilized. For example, a pressure sensor, e.g. a pressure transducer, may be installed onto a cement treating line to monitor discharge pressure of the mud pumps and to record it in the cement job file. In another embodiment, the cementing system may be tied into the rig in a manner which enables use of a rig pressure sensor. Additionally, the sensor system may comprise a flowmeter used in conjunction with the cementing system to allow the displacement flow rate to be recorded and totalized. This type of sensor may be used to establish a secondary backup record in addition to the displacement volume record provided by, for example, rig mud pump stroke counters and rig mud pit volume monitors.

Referring generally to FIG. 1, an example of a wellsite layout 30 is illustrated. In this example, the wellsite layout 30 comprises a rig 32 having a variety of components including a rig floor 34 which may be positioned generally above a well 36 having at least one borehole 38, e.g. a wellbore. A mud pump assembly 40 is positioned on the rig 32 and comprises at least one mud pump 42, e.g. a plurality of mud pumps 42. The mud pumps 42 are operated to pump mud to the rig floor 32 via a mud line 44 and then down into the borehole 38 to facilitate a drilling operation. (As explained in greater detail below, the mud pumps 42 also are operated to pump cementing fluid to the rig floor 32 via a separate cementing line 45 and then down into borehole 38 to facilitate a cementing operation.) It should be noted the drilling equipment for drilling borehole 38 has not been illustrated so as to facilitate explanation of the mud pumping operation and cementing operation.

By way of example, mud may be supplied to the mud pumps 42 from a mud supply 46 via mud supply lines 48. The mud supply 46 may comprise a mud pit and various supporting components, such as a water tank 50, a trip tank 52, a process tank 54, and an active tank 56. In operational examples, the mud may be mixed at various suitable locations and supplied to mud pumps 42. It should be noted a cement mixing skid 60 also is in communication with mud pumps 42 via a process line or lines 62.

Referring again to FIG. 1, the illustrated embodiment also comprises a cement mixer 64 which may be located on the skid 60. The cement mixer 64 is operated to mix a cementing fluid formed from suitable constituents. The constituents may be supplied via supply tanks 66 which may include, for example, silos 68 containing cement, other dry materials, additives, and/or other cementing fluid constituents. The supply tanks 66 also may comprise water tanks 70 which contain water for mixing with the cement and other cementing fluid constituents. The water may be supplied to cement mixer 64 via a suitable water line 72. (It should be noted that in an alternate embodiment in which the skid 60 is integrated into the rig mud system, the cement mixer 64 also could be used as a mud mixer.)

Additionally, the overall wellsite layout 30 may comprise one or more generators 74 used to supply electric power via a generator distribution system 76. By way of example, the electric power may be supplied to a generator interface 78 which, in turn, distributes power to certain electrically powered components, such as the cement mixer 64. In some embodiments, the mud pumps 42 may be operated/controlled via a variable frequency drive (VFD) 80 which is coupled with the generators 74. The generator interface 78, VFD 80, and/or other control components may be used to provide a common control system for both mud pumping and cementing operations. Depending on the location of the wellsite layout 30 and/or available electric power, the generators 74 may be diesel powered generators which include diesel engines supplied with diesel from a suitable diesel tank 82. However, other sources of power may be used to directly provide electric power or to power the generators 74.

Figure 2:
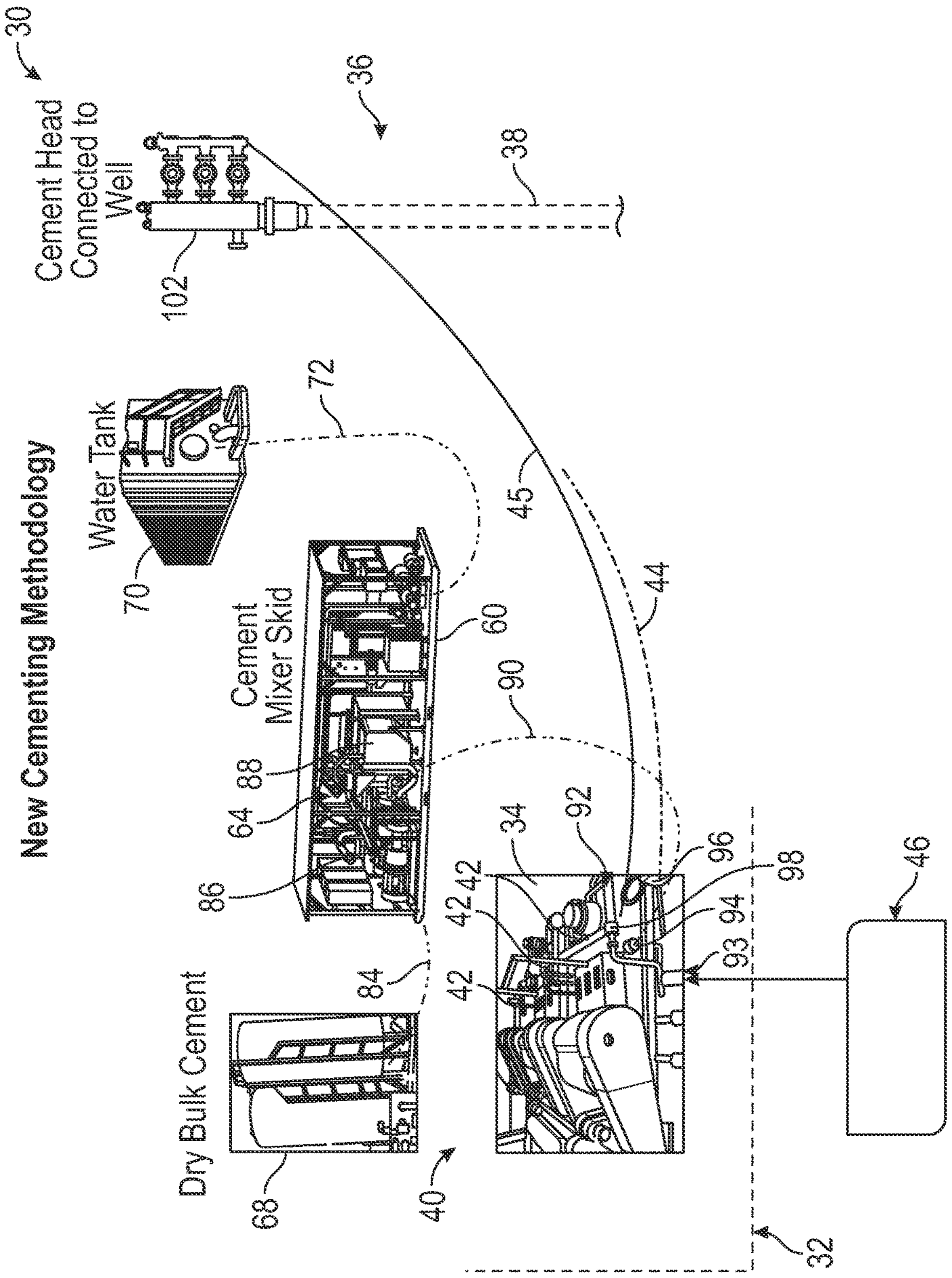
FIG. 2 is another illustration of an example of a wellsite layout in which the mud pump assembly is deployed on a rig and cementing fluid is mixed on a separate cement mixer skid for delivery to the mud pump assembly, according to an embodiment of the disclosure.

Referring generally to FIG. 2, portions of the wellsite layout 30 are illustrated to facilitate explanation regarding use of the mud pumps 42 for both a mud pumping operation and a cementing operation. In this example, cement mixer 64 is located on skid 60 which may be remote from the rig 32. However, some embodiments may incorporate cement mixer 64 into the rig 32. As illustrated, dry bulk cement is provided to cement mixer 64 from silos 68 via a supply line 84. Additionally, water is supplied to cement mixer 64 from water tank 70 via water line 72. The cement mixer 64 may comprise a motor 86 to drive a cement mixing assembly 88 so as to mix the dry bulk cement, water, and potentially other additives so as to form a desired cementing fluid, e.g. cement slurry. The cementing fluid may be delivered from skid 60 to the mud pumps 42 via one or more suitable process lines 90 (see also FIG. 1).

To facilitate use of the same mud pumps 42 for both a mud pumping operation and the cementing operation, the pumping of mud and the pumping of cementing fluid are separated. Additionally, the mud pump assembly 40 is constructed to facilitate cleanout of mud and cement so as to avoid contamination of the cement with mud or vice versa as the mud pumps 42 are switched between the mud pumping operation and the cementing operation.

According to one embodiment, this dual use of the same mud pumps 42 is facilitated by providing the mud pump assembly 40 with a suction manifold 92 having a separate mud supply 93 and cement supply 94. Furthermore, the mud and the cementing fluid may be discharged to the rig floor 34 and then to the borehole 38 via a mud outlet 96 connected to mud line 44 and a separate cementing fluid outlet 98 connected to the cementing fluid line 45 (see also FIG. 1). In the example illustrated, the cementing fluid line 45 also is coupled with a cement head 102 connected to the well 36 above borehole 38. The cement head 102 is used introduce cement fluid down into the borehole 38 to perform a desired cementing operation, e.g. cementing of casing along the borehole 38.

Figure 3:
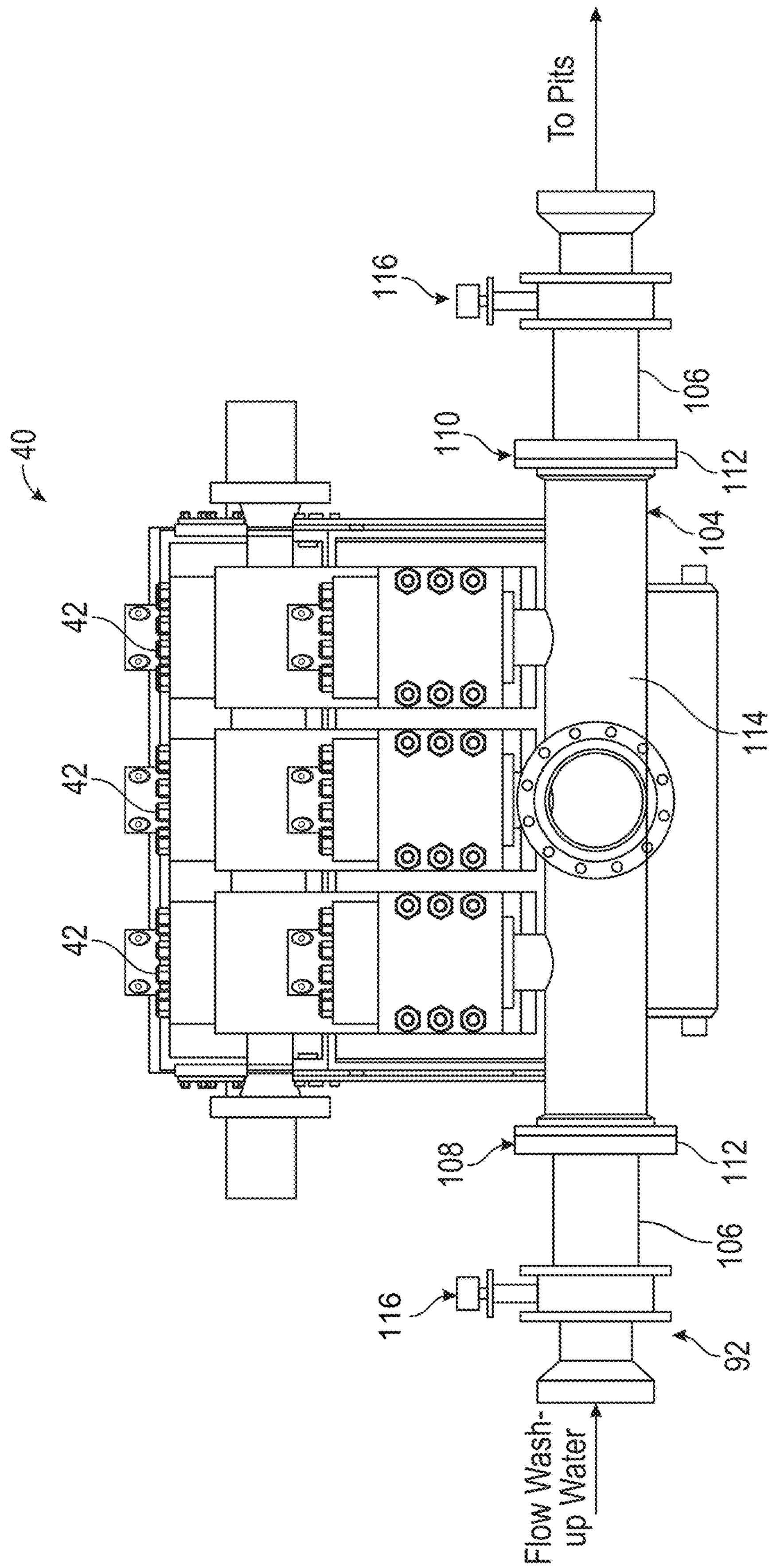
FIG. 3 is an illustration of an example of a mud pump assembly suction manifold which has been constructed to facilitate cleanout of the mud pump assembly between mud pumping and cementing operations, according to an embodiment of the disclosure.
Figure 4:
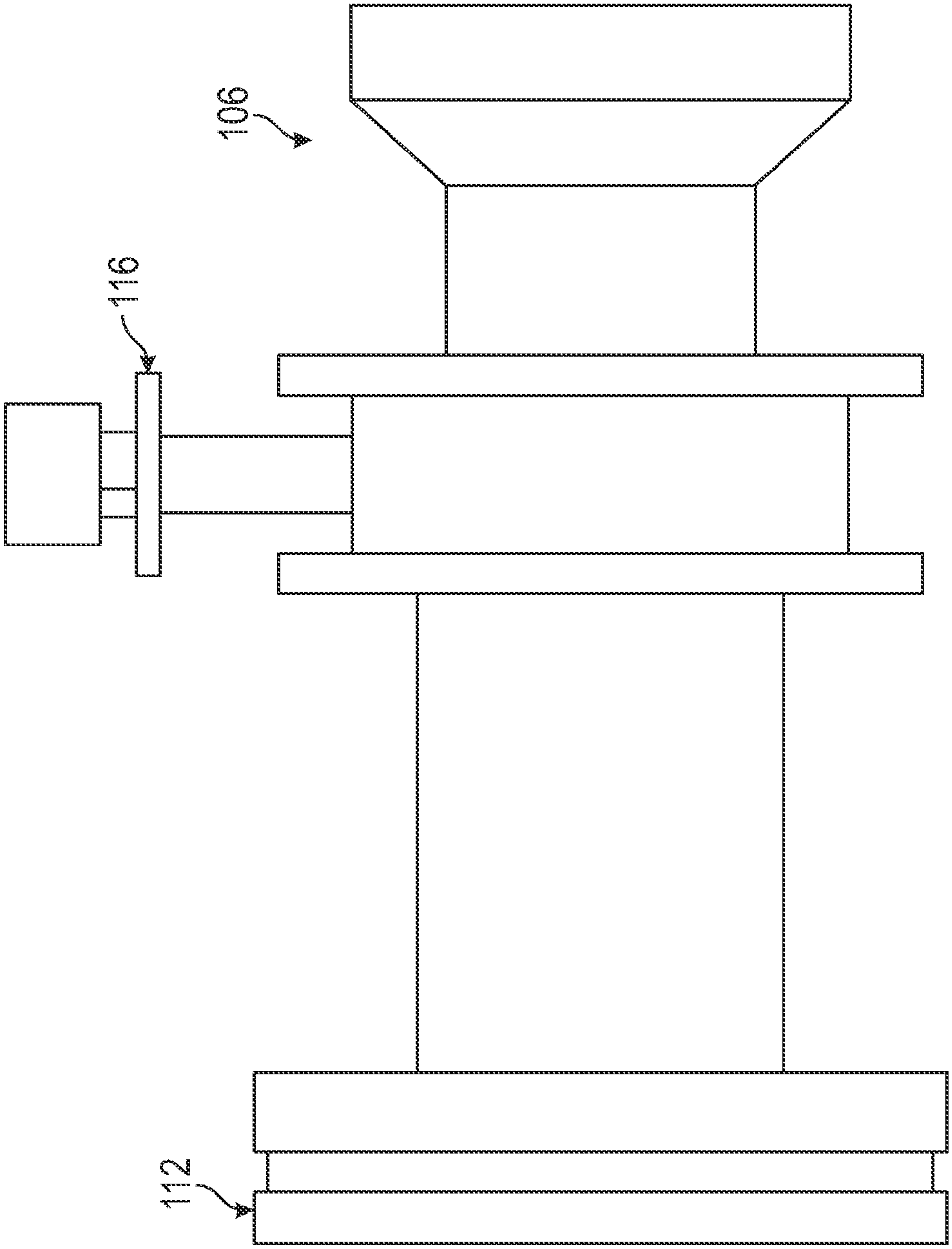
FIG. 4 is an illustration of an example of a portion of the mud pump assembly illustrated in FIG. 3, according to an embodiment of the disclosure.

With additional reference to FIG. 3, the mud pump assembly 40 has been constructed to facilitate cleanout between operations utilizing mud and cementing fluid. According to an embodiment, the suction manifold 92 of mud pump assembly 40 is provided with a flush out line 104 which facilitates flushing of mud and cementing fluid. The flush out line 104 comprises coupling members 106 positioned on an upstream end 108 and a downstream end 110, respectively, to effectively provide cleanout ports. Each coupling member 106 may comprise a suitable coupling 112, e.g. a victaulic coupling, (see also FIG. 4) which is connected to flush tubing 114. The flush tubing 114 is able to supply flushing water (or other suitable fluid) to the areas exposed to mud and cementing fluid within mud pump assembly 40. Additionally, each coupling member 106 may comprise an actuatable valve 116, e.g. a butterfly valve, to enable closure of flush out line 104 during, for example, a mud pumping operation or cementing operation.

To flush out mud and/or cementing fluid, a water tubing may be connected to the coupling member 106 at upstream end 108 to enable water to be directed into flush out line 104 and the portions of mud pump assembly 40 exposed to mud and cementing fluid. Similarly, a discharge tubing may be connected to the coupling member 106 at downstream end 110 to direct the "dirty" water to an appropriate discharge area, e.g. to the mud pits.

Figure 5:
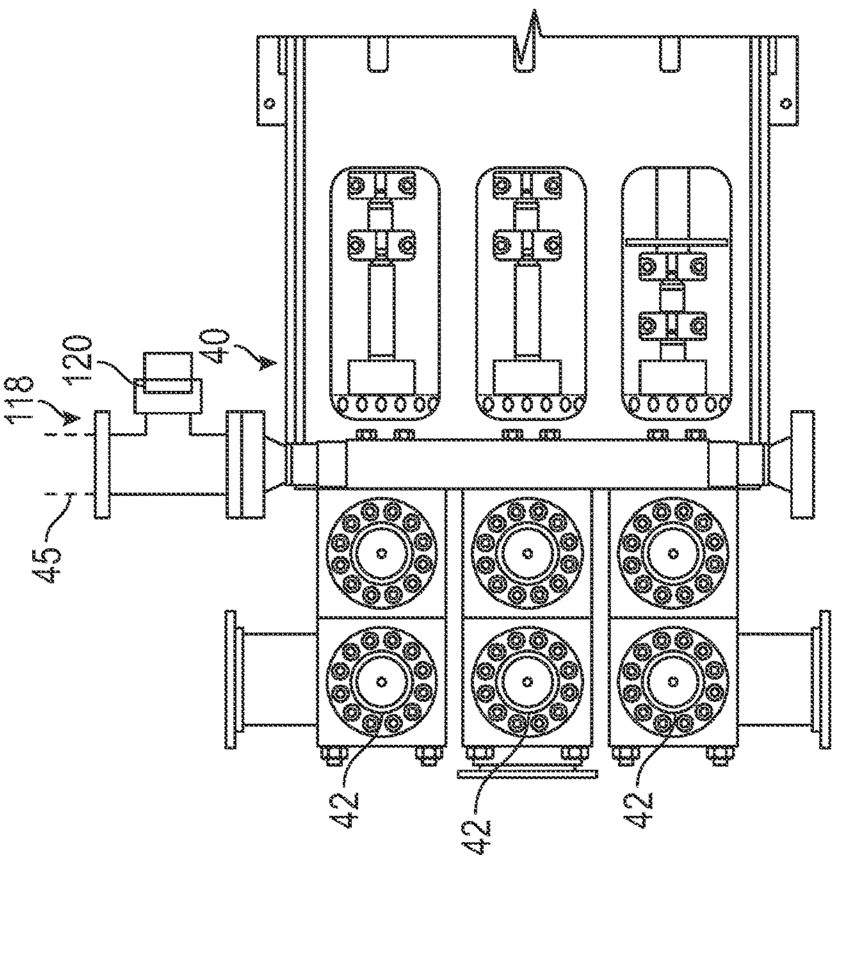
FIG. 5 is an illustration of an example of a sensor system having at least one sensor to facilitate monitoring of the mud pump assembly operation, according to an embodiment of the disclosure.

Because the same mud pumps 42 are used for the mud pumping operations and cementing operations, various types of sensor systems 118 may be employed to monitor the pumping operations. As illustrated in FIG. 5, for example, a pressure sensor 120, e.g. a pressure transducer, may be installed along cementing fluid line 45 or at another suitable location to monitor a discharge pressure of the mud pumps 42. The monitor discharge pressure may be recorded on a cement job file for use by a rig operator. In some embodiments, the cementing pressures may be monitored by existing pressure sensors located on the rig 32.

Figure 6:
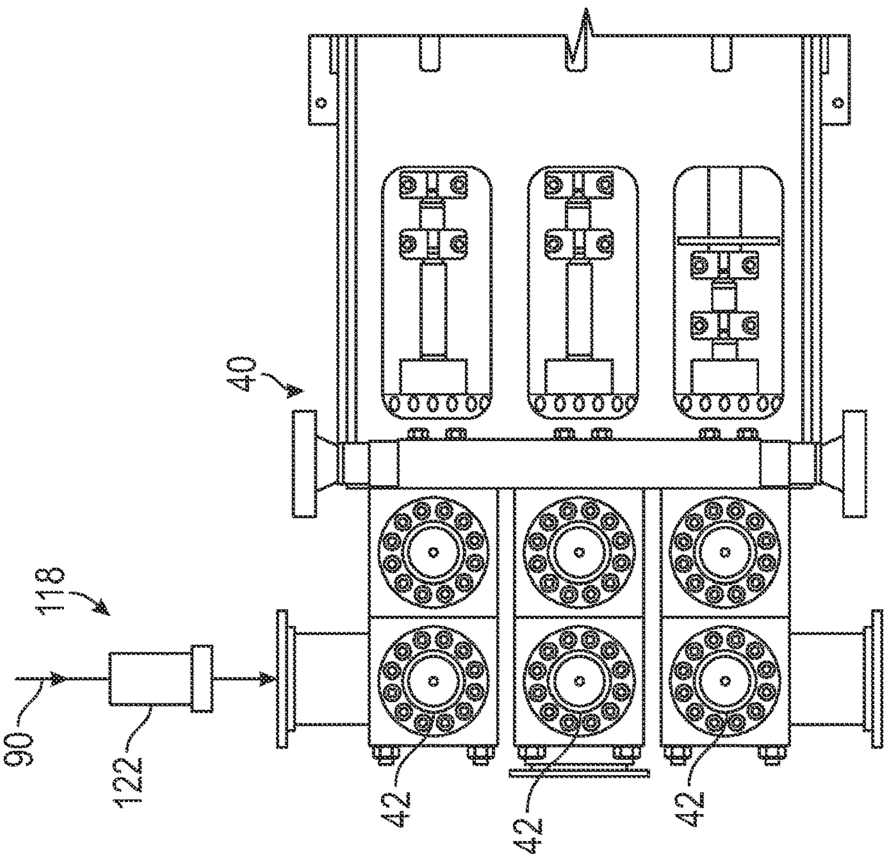
FIG. 6 is an illustration of another example of a sensor system having at least one sensor to facilitate monitoring of the mud pump assembly operation, according to an embodiment of the disclosure.

As further illustrated in FIG. 6, the sensor system 118 also may comprise a full flow flowmeter 122 installed upstream of the mud pumps 42, e.g. on the cement mixer 64 or process line 90. The flowmeter 122 enables a displacement flow rate to be recorded and totalized. This type of monitoring may be used as a secondary backup record of the displacement volume provided by, for example, the rig mud pumps stroke counters and monitoring of the mud pit volumes.

The sensor system 118 also may incorporate other automated and/or manual monitoring which may include use of procedural charts created to tie mud pump strokes to barrels of fluid to help standardize communication between, for example, a cement blender operator and a rig mud pump operator. In some operations, the rig mud pumps 42 may be tied into cement mixer controls via the rig's VFD controls utilized for controlling the mud pumps 42.

Depending on the parameters of a given operation and the environment in which such operation is conducted, the overall wellsite layout 30 may have many different configurations. However, use of the rig mud pumps 42 for both mud operations and for the placement of cementing fluid during primary and/or remedial cementing operations substantially reduces the footprint of wellsite layout 30 while eliminating multiple pieces of equipment. In certain previous applications, conventional cement pumps and/or mud pumps have been used as backup pumps for different operations. That approach, however, does not provide the same spatial efficiency and reduction in equipment afforded by the use of the same rig mud pumps 42 for both mud pumping and cementing operations.

Furthermore, the methodology described herein may be adjusted to utilize various numbers of mud pumps 42 and various types of rigs 32. Additionally, the rig 32 may be equipped with various types of drilling equipment for drilling different types of boreholes 38 in many types of environments. Also, various sequences of drilling, mud pumping, casing, and cementing may be used in constructing the desired well. Similarly, many types of sensors and sensor systems may be employed to monitor the overall construction operation, including mud pumping operations and cementing operations.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method performed at a wellsite, the method comprising:
- providing a mud pump assembly with mud pumps positioned on a rig located at the wellsite;
- operating the mud pumps to perform a mud pumping operation by pumping mud from a mud supply through the mud pumps to a mud outlet of the mud pump assembly to provide the mud downhole during drilling of a borehole;
- clearing the mud from the mud pump assembly by flowing a flushing fluid through a flush out line of a suction manifold of the mud pump assembly to a cleanout port of the mud pump assembly; and
- subsequently operating the mud pumps to perform a cementing operation by pumping cementing fluid from a cementing supply through the mud pumps to a cement outlet of the mud pump assembly to provide the cementing fluid downhole to cement casing in the borehole, thus utilizing the same mud pumps to pump the mud for the mud pumping operation and to pump the cementing fluid for the cementing operation.

2. The method as recited in claim 1, further comprising using a cement mixer skid to mix the cementing fluid.

3. The method as recited in claim 2, further comprising delivering the cementing fluid to the mud pumps via a flowline.

4. The method as recited in claim 1, further comprising flushing the cementing fluid from the mud pump assembly.

5. The method as recited in claim 4, wherein the flushing comprises flushing the cementing fluid from the mud pump assembly by flowing the flushing fluid through the flush out line of the suction manifold of the mud pump assembly to the cleanout port of the mud pump assembly.

6. The method as recited in claim 1, further comprising monitoring a discharge pressure of the mud pumps via a pressure transducer.

7. The method as recited in claim 2, further comprising tracking a flow rate of the cementing fluid discharged at the cement mixer skid.

8. The method as recited in claim 1, further comprising using a common control system during the mud pumping operation and the cementing operation.

9. The method as recited in claim 1, wherein the cement outlet of the mud pump assembly is a separate discharge port to discharge the cementing fluid to provide the cementing fluid downhole to cement the casing in the borehole.

10. The method as recited in claim 1, wherein the clearing comprises:

opening a first valve at an upstream end of the flush out line to enable the flowing of the flushing fluid into the flush out line of the suction manifold of the mud pump assembly; and opening a second valve at a downstream end of the flush out line of the suction manifold of the mud pump assembly to enable the flowing of the flushing fluid through the cleanout port of the mud pump assembly.

11. The method as recited in claim 10, comprising closing the first valve and the second valve while subsequently operating the mud pumps to perform the cementing operation.

12. A system for use in a well, comprising:

a rig located at a wellsite;

a mud pump assembly having a plurality of mud pumps, the mud pump assembly being positioned on the rig;

a cement mixer to mix a cementing fluid that is used during a cementing operation with respect to the well;

a mud supply to provide mud during a mud pumping operation, the cement mixer and the mud supply both being in fluid communication with the mud pumps such that the mud pumps are used to perform the mud pumping operation by pumping mud through the mud pumps to a mud outlet of the mud pump assembly and the cementing operation by pumping the cementing fluid through the mud pumps to a cement outlet of the mud pump assembly; and a flushing fluid supply to provide a flushing fluid to a flush out line of a suction manifold of the mud pump assembly between the mud pumping operation and the cementing operation to flush the mud, the cementing fluid, or both through a cleanout port of the mud pump assembly.

13. The system as recited in claim 12, wherein the cement mixer is located on a skid.

14. The system as recited in claim 12, wherein the cement mixer is located on the rig.

15. The system as recited in claim 12, wherein the mud pump assembly comprises the mud outlet and the cement outlet as separate discharge ports for the mud during the mud pumping operation and the cementing fluid during the cementing operation, respectively.

16. The system as recited in claim 12, further comprising a plurality of sensors to monitor discharge pressure of the mud pumps and displacement flow rate of the cementing fluid.

17. A method for use at a wellsite, the method comprising:

providing a rig with a mud pump assembly having at least one mud pump;

using the at least one mud pump to perform a mud pumping operation by pumping mud from a mud supply through the at least one mud pump to a mud outlet of the mud pump assembly and a cementing operation by pumping a cementing fluid from a cement supply through the at least one mud pump to a cement outlet of the mud pump assembly without having separate cementing operation pumps at the wellsite; and flushing the mud through a cleanout port of the mud pump assembly by providing a flushing fluid through a flush out line of a suction manifold of the mud pump assembly after the mud pumping operation and prior to the cementing operation.

18. The method as recited in claim 17, further comprising flushing the cementing fluid through the cleanout port of the mud pump assembly by providing the flushing fluid through the flush out line of the suction manifold of the mud pump assembly after the cementing operation.

19. The method as recited in claim 18, further comprising using a cement mixer skid to mix the cementing fluid.

20. The method as recited in claim 17, further comprising monitoring a discharge pressure of the at least one mud pump and tracking a flow rate of the cementing fluid.

* * * * *